C. C. FARMER.
FEED VALVE DEVICE.
APPLICATION FILED DEC. 30, 1920.
1,430,893.
Patented Oct. 3, 1922.
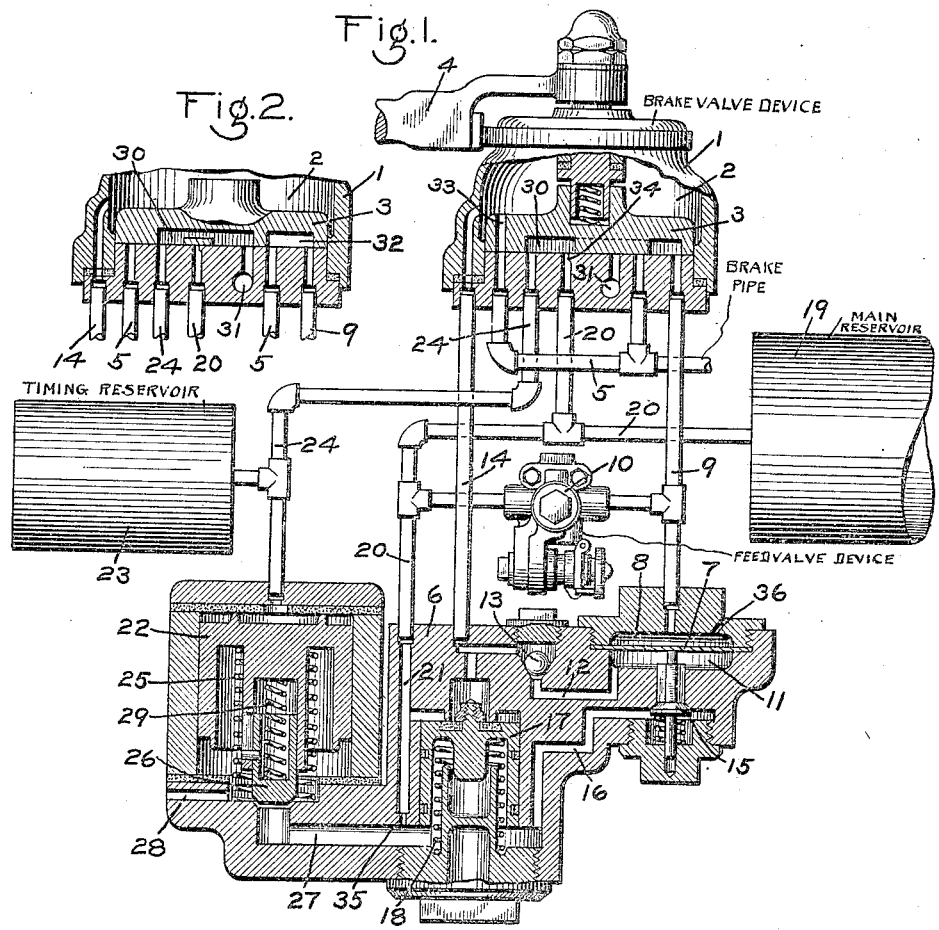
INVENTOR
CLYDE C. FARMER
BY *Wm. M. Cody*
ATTORNEY Patented Oct. 3, 1922.

1,430,893

UNITED STATES PATENT OFFICE.

CLYDE C. FARMER, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

FEED-VALVE DEVICE.

Application filed December 30, 1920. Serial No. 433,982.

*To all whom it may concern:*

Be it known that I, CLYDE C. FARMER, a citizen of the United States, residing at Edgewood, in the county of Allegheny and State of Pennsylvania, have invented new and useful Improvements in Feed-Valve Devices, of which the following is a specification.

This invention relates to fluid pressure brakes, and more particularly to means for controlling the supply of fluid for recharging the brake pipe in releasing the brakes.

With the standard automatic fluid pressure brake system, if the brake valve handle is turned to full release position, fluid at full main reservoir pressure is supplied to the brake pipe, and if the handle is allowed to remain in full release position for too long a period, the brake pipe will become overcharged.

The principal object of my invention is to provide means for preventing the overcharge of the brake pipe when the brake valve handle is placed in full release position.

In the accompanying drawing; Fig. 1 is a diagrammatic view, mainly in section, of a fluid pressure brake equipment embodying my invention; and Fig. 2 a sectional view of the brake valve in running position.

In Fig. 1 of the drawing is shown a brake valve device of the usual construction, comprising a casing 1 having a valve chamber 2, containing a rotary valve 3 adapted to be operated by a handle 4 for controlling the admission and exhaust of fluid under pressure to and from the brake pipe 5.

According to my invention, a valve device is provided for controlling the supply of fluid to the brake pipe in releasing the brakes, comprising a casing 6, containing a diaphragm 7, having chamber 8 at one side connected to a pipe 9 through which the usual feed valve device 10 supplies fluid to the brake valve device, so that said diaphragm is constantly subject on one side to fluid at feed valve pressure. The chamber 11 at the opposite side of the diaphragm 7 is connected by passage 12, containing check valve 13, to pipe 14, through which fluid under pressure is supplied to the rotary valve chamber 2.

A valve 15 is adapted to be operated by diaphragm 7 for controlling communication from a passage 16 to chamber 11.

For controlling the supply of fluid under pressure to pipe 14, a valve piston 17 is provided, having one side open to passage 16 and subject to the pressure of a spring 18 and adapted to control communication from the main reservoir 19 through a pipe 20 and a passage 21 to the pipe 14.

For controlling the operation of the valve piston 17, a limiting valve device is provided, comprising a double seated piston 22, subject on one side to the pressure in a timing reservoir 23 as supplied through a pipe 24 and on the opposite side to the pressure of a spring 25.

The piston 22 operates a valve 26 for controlling communication from a passage 27, leading to the spring side of valve piston 17, to an atmospheric vent port 28, the piston 22 being movable relatively to the valve 26, and said valve being acted upon by a spring 29, so as to ensure the seating of the piston 22 as well as the valve 26.

In running position, as well as all other positions of the brake valve, except full release position, the pipe 24 is connected through a cavity 30 in the rotary valve 3 with an exhaust port 31, so that in these positions, the timing reservoir 23 is maintained at atmospheric pressure and the upper side of the piston 22 being therefore subject to atmospheric pressure, the piston 22 will be maintained in its upper position by spring 25, and the valve 26 will then be held open, thus venting fluid under pressure from the spring side of the valve piston 17.

Fluid from the main reservoir 19, supplied through pipe 20 to the upper face of valve piston 17 then operates to maintain the piston in its open position, in which fluid is supplied from the main reservoir to the pipe 14 and thence to the rotary valve chamber 2.

In running position, the brake pipe pressure is maintained in the usual manner by means of feed valve device 10, which supplies fluid through pipe 9 and cavity 32 to the brake pipe 5, as shown in Fig. 2.

If the brake valve handle is turned to full release position, the brake pipe is initially supplied with fluid at full main reservoir pressure from valve chamber 2, through port 33 in the rotary valve 3 to the brake pipe 5, as shown in Fig. 1, since the valve piston 17 is still in its open position.

In release position, however, the timing reservoir 23 is connected to the main reservoir 19 through pipe 20, cavity 30 in the rotary valve 3 and pipe 24.

The port connection of pipe 20 is restricted at 34, so that it requires a predetermined time to charge the reservoir 23 to main reservoir pressure.

When the pressure in the timing reservoir 23 has been increased to a predetermined degree, the time required being dependent upon the size of the port 34, and such that there will be no danger of overcharging the brake pipe to an undesired extent, the piston 22 will be operated to close the valve 26 and cut off the exhaust port 28 from passage 27. The pressure on the spring side of the valve piston 17 then quickly builds up by flow through the restricted port 35 and the fluid pressures quickly becoming equalized on opposite sides of the valve piston, the spring 18 operates to move the piston to its upper seat, cutting off the further flow of fluid from the main reservoir to the rotary valve chamber 2.

As soon as the valve piston 17 moves to its closed position, the pressure in valve chamber 2 and pipe 14 drops by flow to the brake pipe and consequently, the pressure in chamber 11 at one side of diaphragm 7 is reduced by flow past check valve 13 to pipe 14, so that the feed valve pressure acting in chamber 8 operates the diaphragm 7 to open valve 15 and permit the flow of fluid from the main reservoir 19 through passage 21, passage 16, past the valve 15 to passage 12 and past the check valve 13 to pipe 14 and thence to valve chamber 2 and the brake pipe 5.

The flow of air to the brake pipe continues until the brake pipe pressure has been increased to substantially feed valve pressure, when the valve 15 is allowed to seat, cutting off the further flow of fluid to the brake pipe.

The chamber 8 may be provided with a restricted atmospheric port 36, so as to prevent possible overcharging of chamber 8 above the standard feed valve pressure through leakage from the feed valve device.

If the brake valve handle is turned from full release position to running position, the timing reservoir 23 will be vented to the atmosphere through cavity 30 and exhaust port 31, as hereinbefore described, so that the piston 22 will again assume its upper position, in which the valve 26 is opened and the valve piston 17 is operated to open communication for supplying fluid from the main reservoir to the rotary valve chamber 2.

Having now described my invention, what I claim as new and desire to secure by Letters Patent, is:

1. In a fluid pressure brake, the combination with a brake pipe, main reservoir, and a brake valve device having a position for supplying fluid from the main reservoir to the brake pipe, of a valve device operated upon venting fluid from one side for supplying fluid to the brake pipe, a valve for venting fluid from said valve device, a reservoir, and means operated upon a predetermined increase in pressure in said reservoir for closing said valve.

2. In a fluid pressure brake, the combination with a brake pipe, main reservoir, and a brake valve device having a full release position in which fluid is supplied from the main reservoir to the brake pipe, of valve means operated upon venting fluid from one side for supplying fluid from the main reservoir to the brake pipe, a valve for venting fluid from said valve means, a reservoir adapted to be charged with fluid under pressure at a predetermined rate in the full release position of the brake valve device, and means operated at a predetermined increase in pressure in said reservoir for closing said valve.

3. In a fluid pressure brake, the combination with a brake pipe, main reservoir, and a brake valve device having a full release position in which fluid is supplied from the main reservoir to the brake pipe, of a valve piston normally subject on opposite sides to fluid under pressure and operated upon venting fluid from one side for supplying fluid from the main reservoir to the brake pipe, a reservoir adapted to be charged with fluid under pressure at a predetermined rate in the full release position of the brake valve device, and a valve device for venting fluid from said valve piston and operated upon a predetermined increase in pressure in said reservoir for cutting off the venting of fluid from said valve piston to thereby permit said valve piston to close and cut off the further flow of fluid from the main reservoir to the brake pipe.

4. In a fluid pressure brake, the combination with a brake pipe, main reservoir, and a brake valve device having a position for supplying fluid from the main reservoir to the brake pipe, of a reservoir adapted to be charged with fluid under pressure from the main reservoir at a predetermined rate and means for controlling the supply of fluid from the main reservoir to the brake valve device and operated upon a predetermined increase in pressure in said reservoir for cutting off the flow of fluid from the main reservoir.

5. In a fluid pressure brake, the combination with a brake pipe, main reservoir, and a brake valve device having a position for supplying fluid from the main reservoir to the brake pipe, of means for controlling the supply of fluid from the main reservoir to the brake valve device and operated after a predetermined time interval for cutting off the supply of fluid from the main reservoir and a valve mechanism for then supplying fluid to the brake pipe at a maximum pressure less than full main reservoir pressure.

6. In a fluid pressure brake, the combination with a brake pipe, main reservoir, and a brake valve device having a full release position, of means operated upon movement of the brake valve device to full release position for first supplying fluid at full main reservoir pressure through the brake valve device to the brake pipe and for then supplying fluid to the brake pipe at a maximum pressure a predetermined degree less than the full main reservoir pressure.

In testimony whereof I have hereunto set my hand.

CLYDE C. FARMER.